Patented Oct. 29, 1940

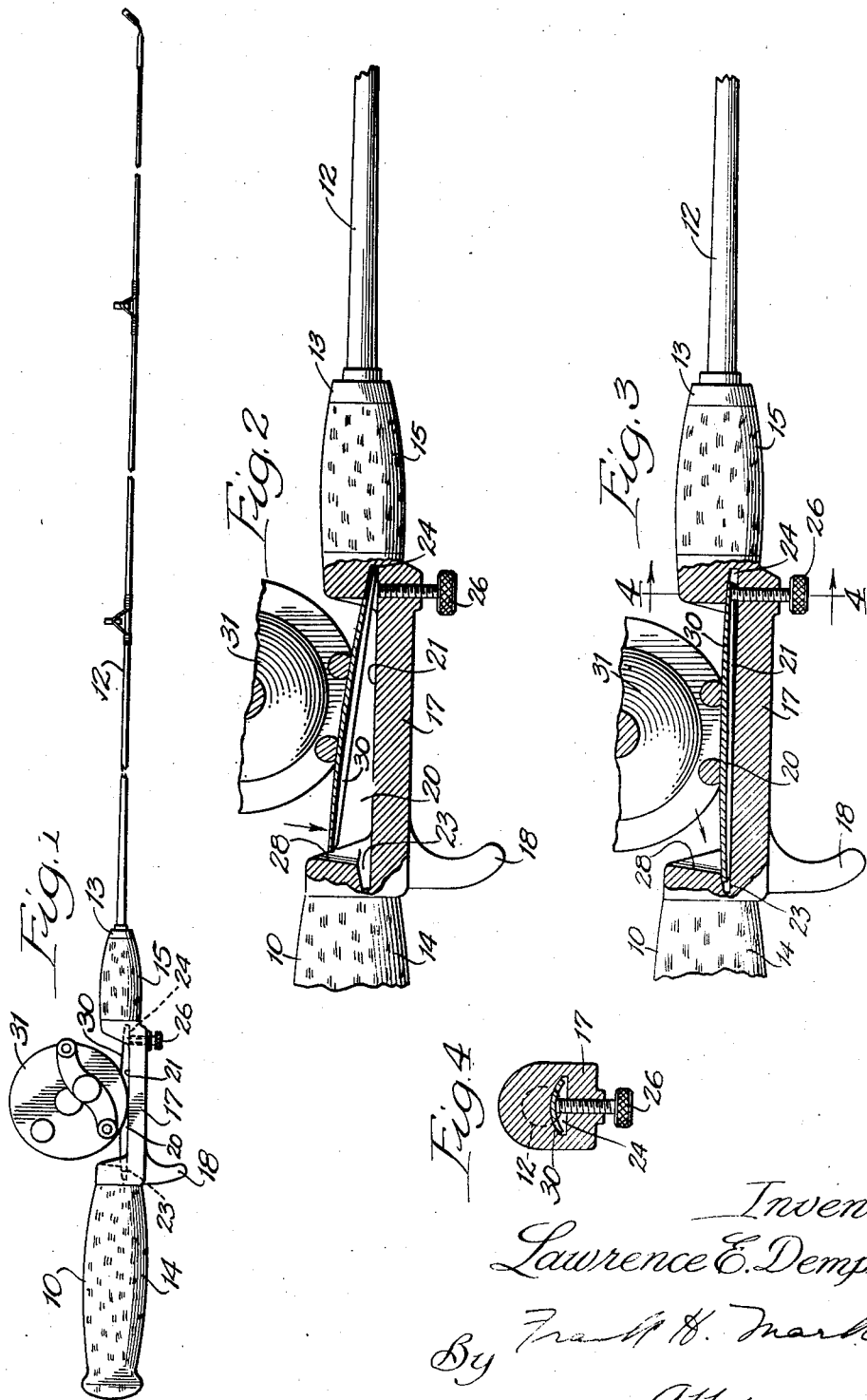

2,219,474

UNITED STATES PATENT OFFICE 2,219,474

FISHING ROD HANDLE

Lawrence E. Dempsey, Oak Park, Ill., assignor to Sears, Roebuck and Co., Chicago, Ill., a corporation of New York Application April 30, 1938, Serial No. 205,176

6 Claims. (Cl. 43—22)

My invention relates to handles for fishing rods, and a particular object of my invention is to provide such a handle with an improved reel seat.

Another object of my invention is to provide a fishing rod handle with a reel seat having a minimum number of parts, which is simple in construction, convenient to use, which will seat a reel securely, and which in general will be entirely satisfactory for the purposes desired.

Various other objects and advantages will become apparent as the description proceeds.

Referring now to the drawing forming a part of this specification and illustrating a preferred embodiment of my invention, Fig. 1 is a side elevational view of a fishing rod embodying my invention and showing a reel mounted thereon;

Fig. 2 is an enlarged fragmentary elevational view of the handle, partly in section, and showing a reel in process of being mounted or removed;

Fig. 3 is a similar view showing a reel in mounted position; and

Fig. 4 is a sectional view taken substantially on the line 4—4 of Fig. 3.

The numeral 10 represents in general a handle embodying my invention, to which may be attached a rod 12 as, for example, in the usual way by means of a socket formed in the forward end 13 of the handle.

Between grips 14 and 15 on the handle, there is provided a reel seat 17 on the lower rear portion of which may be arranged a trigger-like finger grip 18. The reel seat comprises a cutaway portion 20 defining a base 21 and at opposite ends of the base are relatively shallow cavities 23 and 24 for receiving the base of a reel. As shown in Figs. 2 and 3, one of the cavities, e. g., cavity 24, is preferably longer than the other, and associated with this cavity is a set screw 26 threaded through the base portion. A wall 28 of the cutaway portion 20 preferably slopes downwardly and backwardly to facilitate passage of the base member 30 of the reel 31.

To attach a reel to a handle embodying my invention, one end of the reel base 30 is first inserted in the longer cavity 24 and the reel base is then moved in an arc downwardly until its other end engages the base 21 of the reel seat. The reel base 30 is then slid backwardly on the seat 21 until it has reached the extremity of the shorter cavity 23. The set screw is then tightened up against the reel base 30, which is locked in position as shown in Fig. 3. Removal of the reel from the handle requires merely a reversal of the steps outlined above, i. e., releasing the set screw, moving the reel base forward into cavity 24, swinging the rear end of the reel base in an upward arc, and then entirely removing the reel.

The set screw may, of course, extend from the top instead of from the bottom, but it is preferably in the position shown for obvious esthetic reasons.

The set screw may be associated with either of the cavities and the deeper cavity may be disposed at either the forward or rear end of the reel seat.

Various other changes and variations coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. A fishing rod handle having a reel base seat consisting of a pair of opposed cavities for the reception of a reel base, said cavities being open only toward each other and one of said cavities being longer than the other, means affording access of a reel base to said cavities, and a set screw associated with one of said cavities for clampingly engaging a reel base.

2. A fishing rod handle having a reel base seat consisting of a pair of opposed cavities for the reception of a reel base, said cavities being open only toward each other and one of said cavities being longer than the other, means affording access of a reel base to said cavities, and a set screw associated with the longer of said cavities for clampingly engaging a reel base.

3. A fishing rod handle having a reel base seat consisting of opposed cavities for the reception of a reel base, said cavities being open only toward each other, and one of said cavities being longer than the other, said handle having walls leading to said cavities to facilitate the introduction of a reel base into said cavities, the distance between said walls increasing from top to bottom thereof, and a set screw associated with one of said cavities for clampingly engaging a reel base.

4. A fishing rod handle having a reel base seat consisting of opposed cavities for the reception of a reel base, said cavities being open only toward each other, and one of said cavities being longer than the other, means affording access of a reel base to said cavities, a set screw associated with the longer of said cavities for clampingly engaging a reel base, the latter cavity decreasing in depth from the open to the closed end thereof to permit swinging movement of a reel base being seated therein.

5. A fishing rod handle having a body portion and spaced walls integral with and projecting up from said body portion, said walls being undercut adjacent said body portion, providing end cavities open only toward each other, said walls affording access of ends of a reel base to the respective cavities, and a set screw associated with one of said cavities for clampingly engaging an end of a reel base.

6. A fishing rod handle having a body portion and spaced walls integral with and projecting up from said body portion, said walls being undercut adjacent said body portion, providing end cavities open only toward each other, said walls affording access of ends of a reel base to the respective cavities, one of said cavities being longer than the other, and a set screw associated with the longer cavity for clampingly engaging an end of a reel base.

LAWRENCE E. DEMPSEY.